US008601715B2

(12) United States Patent
Tweedy, Jr. et al.

(10) Patent No.: US 8,601,715 B2
(45) Date of Patent: Dec. 10, 2013

(54) ULTRAVIOLET CURING SYSTEM INCLUDING SUPPLEMENTAL ENERGY SOURCE

(75) Inventors: Robert J. Tweedy, Jr., Coon Rapids, MN (US); Christopher B. Adams, Plymouth, MN (US); Kevin K. Hobbie, Falcon Heights, MN (US); Vikki K. Young, Plymouth, MN (US)

(73) Assignee: Tennant Company, Minneapolis, MN (US)

( * ) Notice: Subject to any disclaimer, the term of this patent is extended or adjusted under 35 U.S.C. 154(b) by 720 days.

(21) Appl. No.: 12/725,700

(22) Filed: Mar. 17, 2010

(65) Prior Publication Data

US 2010/0242298 A1 Sep. 30, 2010

Related U.S. Application Data

(60) Provisional application No. 61/163,719, filed on Mar. 26, 2009.

(51) Int. Cl.

| | |
|---|---|
| ***F26B 7/00*** | (2006.01) |
| ***F26B 3/34*** | (2006.01) |
| ***C09J 5/10*** | (2006.01) |
| ***B05B 5/00*** | (2006.01) |

(52) U.S. Cl.

USPC .............. 34/308; 34/307; 34/275; 156/306.9; 118/642

(58) Field of Classification Search

USPC ............ 34/275, 246, 307, 308; 427/487, 559, 427/98.3, 372.2; 156/273.3, 275.5, 306.9, 156/307.3, 331.1; 264/425, 459, 463, 477, 264/494, 496, 36.22, 552, 209.6, 211.24, 264/272.13; 118/642, 643

See application file for complete search history.

(56) References Cited

U.S. PATENT DOCUMENTS

| | | | |
|---|---|---|---|
| 3,787,303 A | 1/1974 | Guthrie et al. |
| 3,855,093 A | 12/1974 | Guthrie et al. |
| 3,898,349 A | 8/1975 | Kehr et al. |
| 3,930,064 A | 12/1975 | Sander |
| 3,935,364 A | 1/1976 | Proksch et al. |

(Continued)

FOREIGN PATENT DOCUMENTS

| | | |
|---|---|---|
| AU | 2001294567 B2 | 3/2002 |
| WO | WO 2004/073894 A2 | 9/2004 |
| WO | WO 2004/073894 A3 | 11/2004 |

OTHER PUBLICATIONS

Eco-DQF™—Decorative Quartz Flooring Instruction Bulletin. Tennant Company, Minneapolis, MN (Jun. 14, 1999); 3 pages.

(Continued)

*Primary Examiner* — Kenneth Rinehart
*Assistant Examiner* — John McCormack
(74) *Attorney, Agent, or Firm* — Mueting, Raasch & Gebhardt, P.A.

(57) ABSTRACT

Machines and methods for curing ultraviolet (UV)-curable coating materials. In one embodiment, the machine includes a UV radiation source having one or more lamps partially enclosed within a shroud of a curing head. The machine may further include a supplemental energy source located outside of the shroud. The supplemental energy source may illuminate an uncured area of the floor coating material that is beyond the curing head. In some embodiments, the supplemental energy source may reduce or prevent the partial curing of the coating material outside of the curing head resulting from stray UV energy.

26 Claims, 9 Drawing Sheets

(56) References Cited

U.S. PATENT DOCUMENTS

| | | | | |
|---|---|---|---|---|
| 3,975,554 | A | 8/1976 | Kummins et al. | |
| 4,122,225 | A | 10/1978 | Holmstrom et al. | |
| 4,163,082 | A | 7/1979 | Romenesko | |
| 4,241,255 | A | 12/1980 | Sugiyama et al. | |
| 4,287,228 | A | 9/1981 | Schlesinger | |
| 4,289,798 | A | 9/1981 | Bagley et al. | |
| 4,308,118 | A | 12/1981 | Dudgeon | |
| 4,326,001 | A | 4/1982 | Sachs et al. | |
| 4,339,566 | A | 7/1982 | Rosenkranz et al. | |
| 4,348,447 | A | 9/1982 | Miller, Jr. et al. | |
| 4,374,955 | A | 2/1983 | Gupta et al. | |
| 4,411,931 | A | 10/1983 | Duong | |
| 4,421,784 | A | 12/1983 | Troue | |
| 4,478,876 | A | 10/1984 | Chung | |
| 4,479,726 | A | 10/1984 | Townsend | |
| 4,568,558 | A | 2/1986 | Angrick et al. | |
| 4,597,987 | A | 7/1986 | Hockemeyer et al. | |
| 4,656,053 | A | 4/1987 | Angrick et al. | |
| 4,768,311 | A | 9/1988 | Olson | |
| 4,920,254 | A | 4/1990 | DeCamp et al. | |
| 4,921,774 | A * | 5/1990 | Higashiyama | 430/138 |
| 4,999,216 | A | 3/1991 | Gaske et al. | |
| 5,141,990 | A | 8/1992 | McKoy et al. | |
| 5,425,970 | A | 6/1995 | Lahrmann et al. | |
| 5,534,310 | A | 7/1996 | Rokowski et al. | |
| 5,536,758 | A | 7/1996 | Boldt | |
| 5,667,227 | A | 9/1997 | Boldt | |
| 5,712,022 | A | 1/1998 | Tanaka et al. | |
| 5,716,551 | A | 2/1998 | Unruh et al. | |
| 6,096,383 | A | 8/2000 | Berg et al. | |
| 6,197,844 | B1 | 3/2001 | Hamrock et al. | |
| 6,372,340 | B1 | 4/2002 | Tominaga et al. | |
| 6,387,504 | B1 | 5/2002 | Mushovic | |
| 6,423,381 | B1 | 7/2002 | Colton et al. | |
| 6,468,350 | B1 | 10/2002 | Hillenbrand | |
| 6,472,027 | B1 | 10/2002 | Olson et al. | |
| 6,538,258 | B1 | 3/2003 | Rau et al. | |
| 6,761,127 | B2 | 7/2004 | Field et al. | |
| 6,764,719 | B2 | 7/2004 | Russell et al. | |
| 6,780,472 | B2 | 8/2004 | Hamrock et al. | |
| 6,828,296 | B2 | 12/2004 | Olson et al. | |
| 2003/0124339 | A1 * | 7/2003 | Field et al. | 428/323 |
| 2003/0159308 | A1 | 8/2003 | Field et al. | |
| 2005/0109463 | A1 * | 5/2005 | Sellars | 156/379.8 |
| 2006/0099351 | A1 | 5/2006 | Field et al. | |
| 2007/0077367 | A1 * | 4/2007 | Miura | 427/532 |
| 2009/0091266 | A1 * | 4/2009 | Garrett | 315/185 S |

OTHER PUBLICATIONS

Eco-DQF™—Decorative Quartz Flooring Tech Data Bulletin. Tennant Company, Minneapolis, MN (Jun. 7, 1999); 1 page.

Eco-DQF™—Decorative Quartz Flooring Architectural Guide Specification. Tennant Company, Minneapolis, MN (Jul. 1, 1999); 3 pages.

Gush et al., "Thiol/acrylate Hybrid Systems in Radiation-curable Coatings —The Best of Both Worlds," The Chemical Coatings Conference II, Cincinnati, OH, May 10, 1978; pp. 37-53.

Gush et al., "Thiol/acrylate Hybrid Systems May Offer the Best of Both Worlds in Radiation-curable Coatings," *Modern Paint and Coatings*. Nov. 1978; pp. 58, 61, 62, 64, and 66.

Morgan, "Radiation-curable Polymers for Closures," *Radiation Curing*. Aug. 1974;1(3):11-14.

Morgan et al., "Photosensitized Thiol/ene Reactions," The American Chemical Society Division of Organic Coatings and Plastic Chemistry 165th Meeting, Apr. 8-13, 1973;33(1):281-288.

Morgan et al., "Thiol/ene photocurable polymers," *J. Polym. Sci., Polym. Chem. Ed*., 1977; 15(3):627-645.

"Multi-Clean—Ultra Violet, Single Floor Coat System for Tile, Wood & Concrete" datasheet [online]. Minuteman International, Inc., Addison, IL, [retrieved on May 1, 2002]. Retrieved from the Internet: http://www.multi-clean.com/multiclean/ultra.html; 5 pgs.

Pappas, ed., "Light Sources-4," *UV Curing: Science and Technology*, Technology Marketing Corporation, Stamford, CT, 1978; cover and introduction pages, table of contents, and Chapter 4 (pp. 96-132).

Roffey, "2: Ultraviolet lamp systems," *Photopolymerization of Surface Coatings*, John Wiley & Sons, 1982; cover and introduction pages, table of contents, and Chapter 2 (pp. 41-66).

International Preliminary Report on Patentability dated Sep. 27, 2011 for PCT/US2010/027602; 8 pgs.

International Search Report and Written Opinion for PCT/US2010/027602; 15 pgs.

* cited by examiner

ULTRAVIOLET CURING SYSTEM INCLUDING SUPPLEMENTAL ENERGY SOURCE

This application claims the benefit of U.S. Provisional Application No. 61/163,719, filed 26 Mar. 2009, the content of which is incorporated herein by reference in its entirety.

TECHNICAL FIELD

The present invention relates generally to ultraviolet (UV) curing devices and, more particularly, to methods and apparatus to reduce or neutralize unintended effects of stray UV energy emanating outwardly, e.g., laterally, from a UV curing head by using a supplemental energy source.

BACKGROUND

Substrate coatings such as those applied to floor surfaces are known in the art. Such coatings are typically applied as a liquid that subsequently cures to form a durable layer over the underlying floor surface. Curing of the coating is often achieved through a thermal treatment and/or exposure to ambient conditions.

While effective, cure times for many conventional floor coatings may be substantial, e.g., anywhere from several hours to several days. To reduce lengthy cure times, floor coating materials formulated to cure relatively instantly when subjected to ultraviolet (UV) radiation have emerged. These coatings typically include photo-responsive components that cure when exposed to particular wavelengths of UV radiation. In addition to reducing cure time, UV curable coatings may also reduce material costs (e.g., by eliminating solvents) and/or operational costs (e.g., no conventional thermal curing equipment required).

Typically, UV floor coatings are cured by traversing the floor, after the coating material is applied, with a mobile UV illumination source. Exemplary apparatus and systems that may be used to effect curing of the coating material generally include a curing head that forms a shroud having an opening at the bottom, e.g., proximate the floor surface. UV bulb sources are located inside the curing head and are placed to direct UV energy downwardly through the shroud opening and to the coated floor surface. As the head passes over the coated floor surface, the coating material may cure relatively instantly.

While such systems and techniques are certainly effective, drawbacks remain. For instance, UV floor curing heads may often be positioned to provide a gap between the lower edges of the shroud and the floor surface. By making the gap too small (e.g., low shields), dispersion of stray UV light is minimized, but potentially undesirable contact between the shroud and undulations in the floor surface may occur. Conversely, by making the gap too large, excessive stray UV energy may pass outside of the shroud. Depending on the intensity of the escaping stray light and the composition of the floor coating material, the stray light may result in partial curing of the floor coating material that is laterally outside of the curing head (e.g., outboard of the curing head). In some instances, this partial cure may result in the formation of a visible line of surface differentiation in the floor coating that runs along one or both sides of the curing head. When the head is then passed directly over the floor coating containing this visible line, this line may become locked into the cured coating, potentially resulting in an aesthetically undesirable appearance.

SUMMARY

The present invention may overcome these and other issues by providing UV curing systems, apparatus, and methods that incorporate a supplemental energy, e.g., light, source directed at a portion of the substrate surface outside (e.g., to the side of) of a curing head. This supplemental light source may alter the intensity level of, or otherwise disrupt, stray UV energy that escapes outside of the curing head, thus reducing or even preventing partial curing of unintended portions of the substrate surface. Supplemental energy delivered in accordance with embodiments of the present invention may also alter the coating itself, making it less prone to partial curing when illuminated by stray UV energy.

In one embodiment, an apparatus for curing an ultraviolet (UV)-curable coating material applied to a substrate surface is provided, wherein the apparatus includes a curing head having a shroud defining an interior volume. The shroud forms an opening along one side, the opening positionable proximate the substrate surface. The curing head also includes a UV radiation source attached to the shroud, wherein the shroud is configured to direct UV energy from the UV radiation source through the opening of the shroud and towards a portion of the UV-curable coating material applied to a first area of the substrate surface that is aligned with the opening. The apparatus further includes a supplemental energy source attached to the curing head outside of the shroud. The supplemental energy source is configured to deliver energy to a portion of the UV-curable coating material applied to a second area of the substrate surface that is located beyond the shroud. In one configuration, the supplemental energy source is selected to reduce a curing potential of stray UV energy that escapes laterally beyond the shroud. For example, the supplemental energy source may be configured to disrupt a wavelength of the stray UV energy escaping laterally beyond the shroud. In another configuration, the supplemental energy source may be configured to alter a molecular weight of the portion of the UV-curable coating material applied to the second area of the substrate surface. In yet another configuration, the supplemental energy source includes a light source selected from the group consisting of incandescent, halogen, fluorescent, and LED light sources, e.g., a 500 Watt halogen light bulb. In another configuration, the supplemental energy source is movable between a use position and a storage position. In yet another configuration, the supplemental energy source includes a first supplemental energy source located on a first lateral side of the curing head, and a second supplemental energy source located on a second lateral side of the curing head.

Yet another embodiment of the invention may include an apparatus for curing an ultraviolet (UV)-curable coating material applied to a floor surface. This apparatus may include: a frame supported for movement over the floor surface; and a curing head supported by the frame, wherein the curing head includes a shroud having sidewalls defining a partially enclosed interior volume. The shroud defines an opening along a bottom side of the shroud, wherein the opening is positionable over the floor surface. The apparatus may further include a UV radiation source located within the interior volume of the shroud, wherein the shroud is configured to direct UV energy generated by the UV radiation source through the opening of the shroud and towards a portion of the UV-curable coating material applied to a first area of the floor surface that is located beneath the shroud and between the sidewalls. A supplemental light source attached to the curing head outside of the shroud may also be provided. The supplemental light source is configured to illuminate a portion of the UV-curable coating material applied to a second area of the floor surface that is located outside of the sidewalls of the shroud. In one configuration, the supplemental light source is selected from the group consisting of incandescent, halogen, fluorescent, and LED light sources, e.g., a 500 Watt halogen light bulb. In another configuration, the frame includes one or more wheels configured to support the curing head in rolling engagement with the floor surface. In yet another configuration, the supplemental light source is configured to disrupt a wavelength of stray UV energy that escapes beyond the sidewalls of the shroud. Additionally or alternatively, the supplemental light source is configured to increase a molecular weight of the UV-curable coating material applied to the second area of the floor surface. In still another configuration, the supplemental light source is pivotable, relative to the curing head, between a use position and a storage position. And in yet another configuration, the UV radiation source includes one or more bulbs configured to simultaneously emit the UV energy at wavelengths of both: 360 nanometers (nm) to 370 nm; and 250 nm to 260 nm.

In still another embodiment, a method for curing an ultraviolet (UV)-curable coating applied to a substrate surface is provided. The method includes: passing a UV curing apparatus over a first area of the substrate surface covered by a UV-curable coating material, thereby curing the coating material on the first area of the substrate surface; illuminating a portion of the coating material covering a second area of the substrate surface that lies beyond a lateral edge of the curing apparatus with a supplemental energy source; and reducing, with the supplemental energy source, a curing potential of stray UV energy that escapes beyond the lateral edge of the curing apparatus. In one configuration, reducing the curing potential of the stray UV energy includes disrupting a wavelength of the stray UV energy. In another configuration, reducing the curing potential of the stray UV energy additionally or alternatively includes increasing a molecular weight of uncured UV-curable coating material that lies in the second area. In yet another configuration, passing the UV curing apparatus over the first area and illuminating the portion of the coating material covering the second area occur simultaneously. In still yet another configuration, passing the UV curing apparatus over the first area includes illuminating the first area with a UV radiation source.

The above summary is not intended to describe each embodiment or every implementation of the present invention. Rather, a more complete understanding of the invention will become apparent and appreciated by reference to the following Detailed Description of Exemplary Embodiments in view of the accompanying figures of the drawing.

BRIEF DESCRIPTION OF THE VIEWS OF THE DRAWING

The present invention will be further described with reference to the figures of the drawing, wherein.

Figure 1:
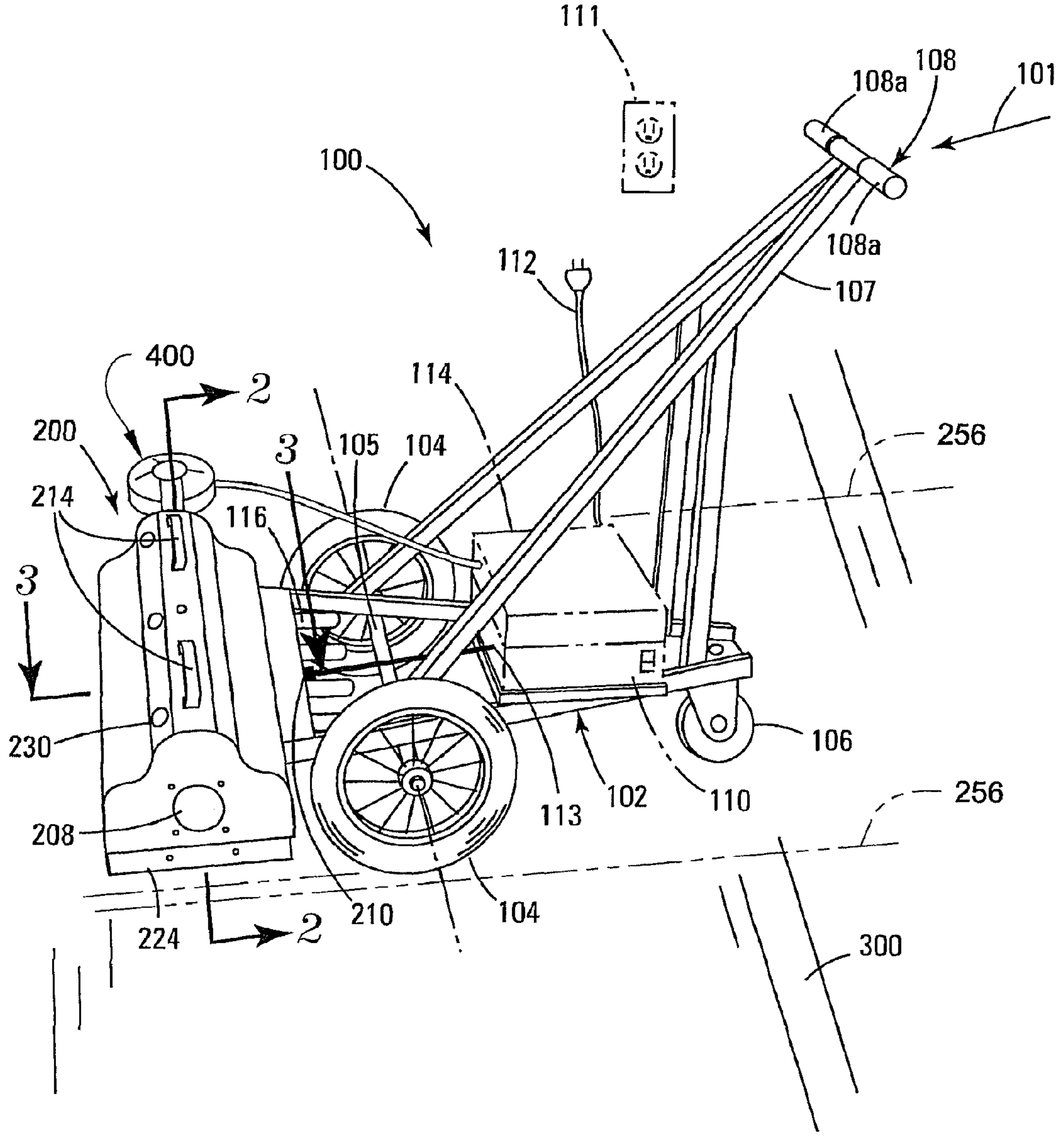
FIG. 1 is a perspective view of a UV curing apparatus in accordance with one embodiment of the invention.

The figures are rendered primarily for clarity and, as a result, are not necessarily drawn to scale.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

Generally speaking, embodiments of the present invention provide systems, apparatus, and methods for ultraviolet (UV) curing of a UV-curable coating material applied to or over a substrate surface. In the illustrated embodiments, the substrate surface is described and illustrated as a fixed floor or floor surface. However, those of skill in the art will appreciate that the systems, apparatus, and methods described herein could be adapted to UV curing applications for most any substrate surface (e.g., floor coverings such as vinyl sheeting, wall surfaces, sheet products, etc.) without departing from the scope of the invention.

After surface preparation, liquid floor coating materials may be applied to a substrate (e.g., floor) surface in most any conventional manner, such as with a roller. After application, the coating is cured to a durable solid state by application of energy, e.g., radiation, emitted from a mobile source of UV radiation as further described below.

The apparatus for curing the floor coating material is preferably a mobile device designed to travel over the floor surface. The apparatus may be a walk behind device (push or self-propelled) or a ride-on device. Ride-on devices and/or self-propelled walk-behind devices may be advantageous where the operator desires to maintain a relatively constant speed, e.g., where more particular and consistent control of UV exposure is desired. Exemplary curing apparatus that may be modified in accordance with embodiments of the present invention are described in, for example, U.S. Pat. Nos. 6,096,383 to Berg et al. and 6,761,127 to Field et al.

For simplicity, the UV curing apparatus will hereinafter be described as a walk-behind, push-powered curing machine 100, exemplary embodiments of which are illustrated in FIGS. 1-3B. In these illustrated embodiments, an operator walks behind the machine 100 and provides a pushing force 101 to a handle 108 to control machine speed and direction. While the machine 100 is described herein as having particular overall dimensions, those of skill in the art will realize that it could be scaled and modified to accommodate applications requiring larger (or smaller) curing widths. The apparatus 100 may be similar in some respects to that described in U.S. Pat. No. 6,761,127 to Field et al. However, embodiments of the present invention differ from known UV curing systems (e.g., by incorporating a supplemental energy source) as further described below.

The embodiment of the machine 100 illustrated in FIG. 1 includes a frame 102 supported for movement over a floor surface 300 by ground engaging support members. The support members may, in one embodiment, include freely rotating forward or front wheels 104 (which rotate about an axis of rotation defined by an axle 105) and at least one rear wheel 106 that support the curing head 200 in rolling engagement with the floor surface 300. The rear wheel 106 may be a swiveling caster wheel that allows the machine 100 to be easily maneuvered during operation.

The frame 102 may be configured in various ways. For example, it may be formed from rectangular tubing (e.g., steel, aluminum, plastic) that is welded or otherwise interconnected to form the desired shape. The frame may alternatively, or additionally, include panel components, e.g., sheet metal, to provide additional structural support or to improve functionality and/or aesthetic appearance. In some embodiments, the frame may disassemble or fold to a compact size for storage/shipment.

As used herein, relative terms such as "left," "right," "fore," "front," "forward," "aft," "rear," "rearward," "top," "bottom," "upper," "lower," "horizontal," "vertical," and the like are from the perspective of one operating the machine 100 (e.g., standing behind the machine (near handle 108) and facing in the direction 101 shown in FIG. 1) while the machine is in an operating configuration, e.g., while the machine is positioned such that the wheels 104 and 106 rest upon a generally horizontal floor surface 300 as shown in FIG. 1. These terms are used herein to simplify the description, however, and not to limit the scope of the invention in any way.

The handle 108, illustrated at the rear of the machine 100 in FIG. 1, may include hand grip portions 108*a* for receiving the hands of the walking operator. In the illustrated embodiment of FIG. 1, the handle 108 and hand grip portions 108*a* are formed by an upwardly extending portion 107 of the frame 102. The handle 108, e.g., grip portions 108*a*, may include controls (not shown) such as switches for operating the machine 100.

The frame 102 may support various onboard equipment. For example, the frame may support an optional ballast apparatus 110 used to power a UV radiation source as further described below. In some embodiments, the ballast receives external power from a power cord 112 coupled to a remote power source, e.g., a 120-volt wall receptacle 111. In other embodiments, the frame 102 may support a cordless, onboard power source 114 (schematically illustrated in FIG. 1) such as a gasoline-power generator set or a rechargeable battery pack.

Forward of the front wheels 104 is a UV curing head 200 supported by the frame 102. The curing head 200 may be cantilevered off the frame 102 such that it is supported and suspended above the floor surface forward of the frame. The curing head 200 is configured to cure a floor width greater than the transverse wheel base (the lateral distance between the outer edges of the wheels 104) of the machine 100. In the embodiment of FIG. 1, the curing head has a curing width of about 27 inches (about 700 millimeters (mm)).

Figures 2A, 2B:
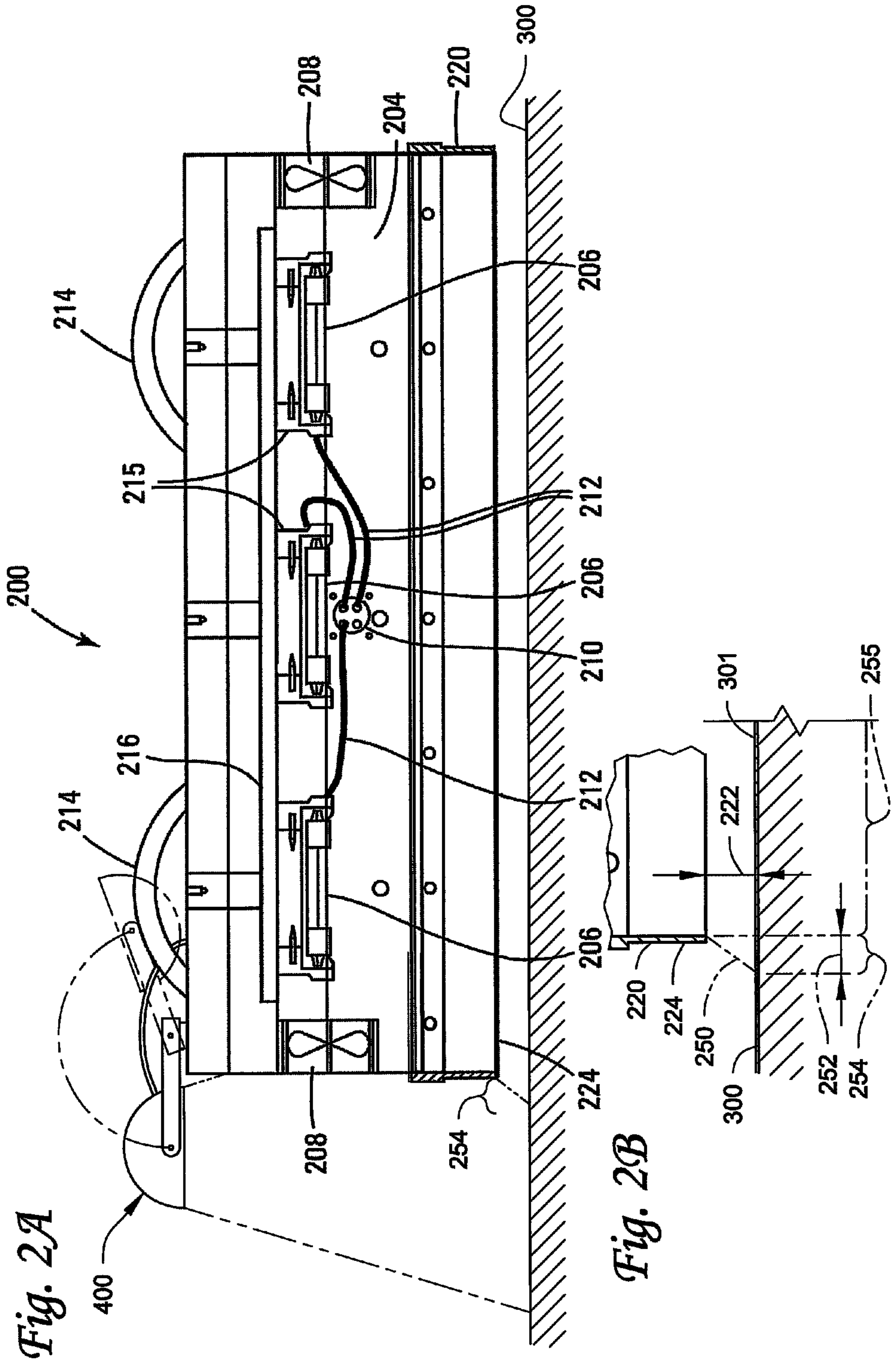
FIG. 2A is a partial section view of the UV curing apparatus of FIG. 1 taken along line 2-2 of FIG. 1.
FIG. 2B is an enlarged partial view of a portion of FIG. 2A.
Figure 3A:
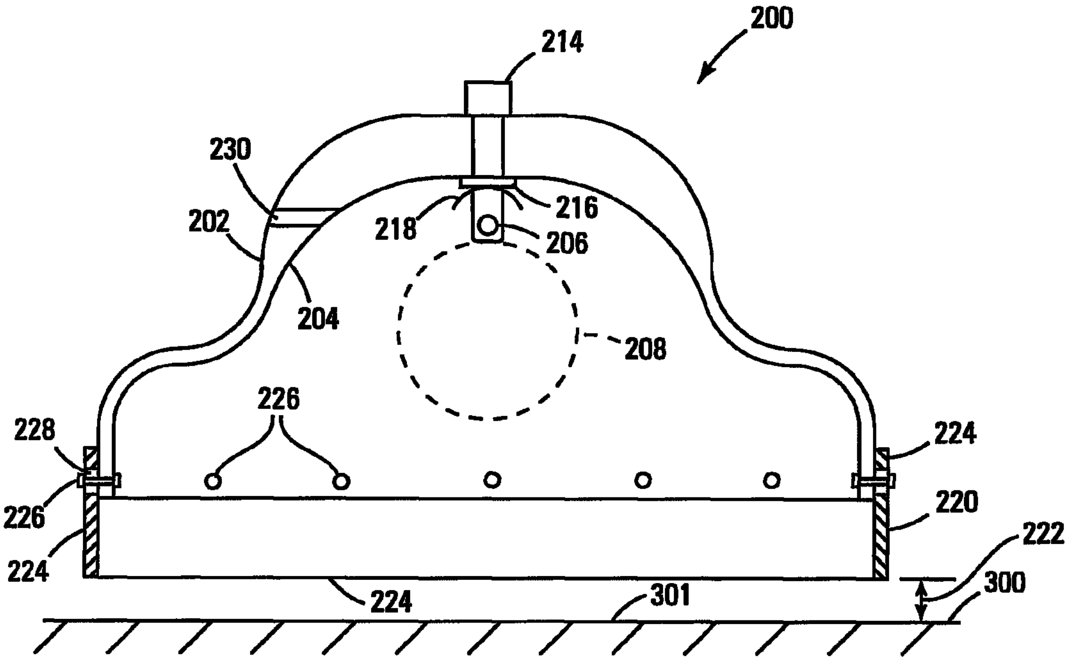
FIG. 3A is a partial section view of the UV curing apparatus of FIG. 1 taken along line 3-3 of FIG. 1.
Figure 3B:
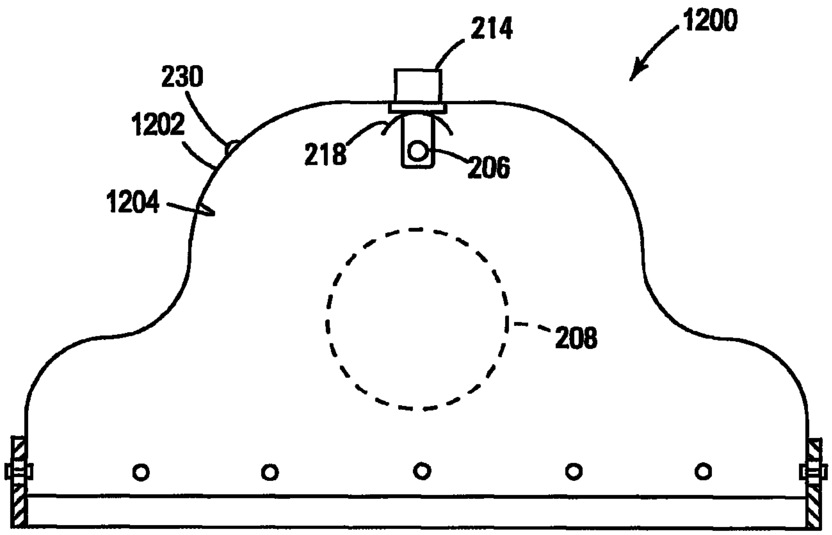
FIG. 3B is an alternate partial section view of the UV curing apparatus of FIG. 1 taken along line 3-3 of FIG. 1.

FIGS. 2A and 3A illustrate orthogonal cross sectional views of one embodiment of the curing head 200 of FIG. 1 (FIG. 3B illustrates a view corresponding to FIG. 3A, but of an alternative embodiment). The curing head 200 may, in one embodiment, include a hood or shroud formed by an outer skin or shell 202 (see FIG. 3A). The shroud may include peripheral walls, e.g., sidewalls 220, that define and partially enclose an interior volume that surrounds and contains the curing head components. In one embodiment, the curing head 200, e.g., shroud, partially surrounds the UV radiation source, e.g., surrounds the top and sides, but forms an opening along one side. The opening is positionable proximate a substrate surface, e.g., the opening may be positioned along a bottom side of the shroud and facing towards the floor surface 300 as shown in FIG. 3A. At least one reflective interior surface 204 (e.g., a contoured aluminum sheet), may be provided to assist in directing the UV radiation generated by the UV radiation source through the opening and towards to the floor surface 300 (when the opening is positioned over the floor surface).

Figure 4A:
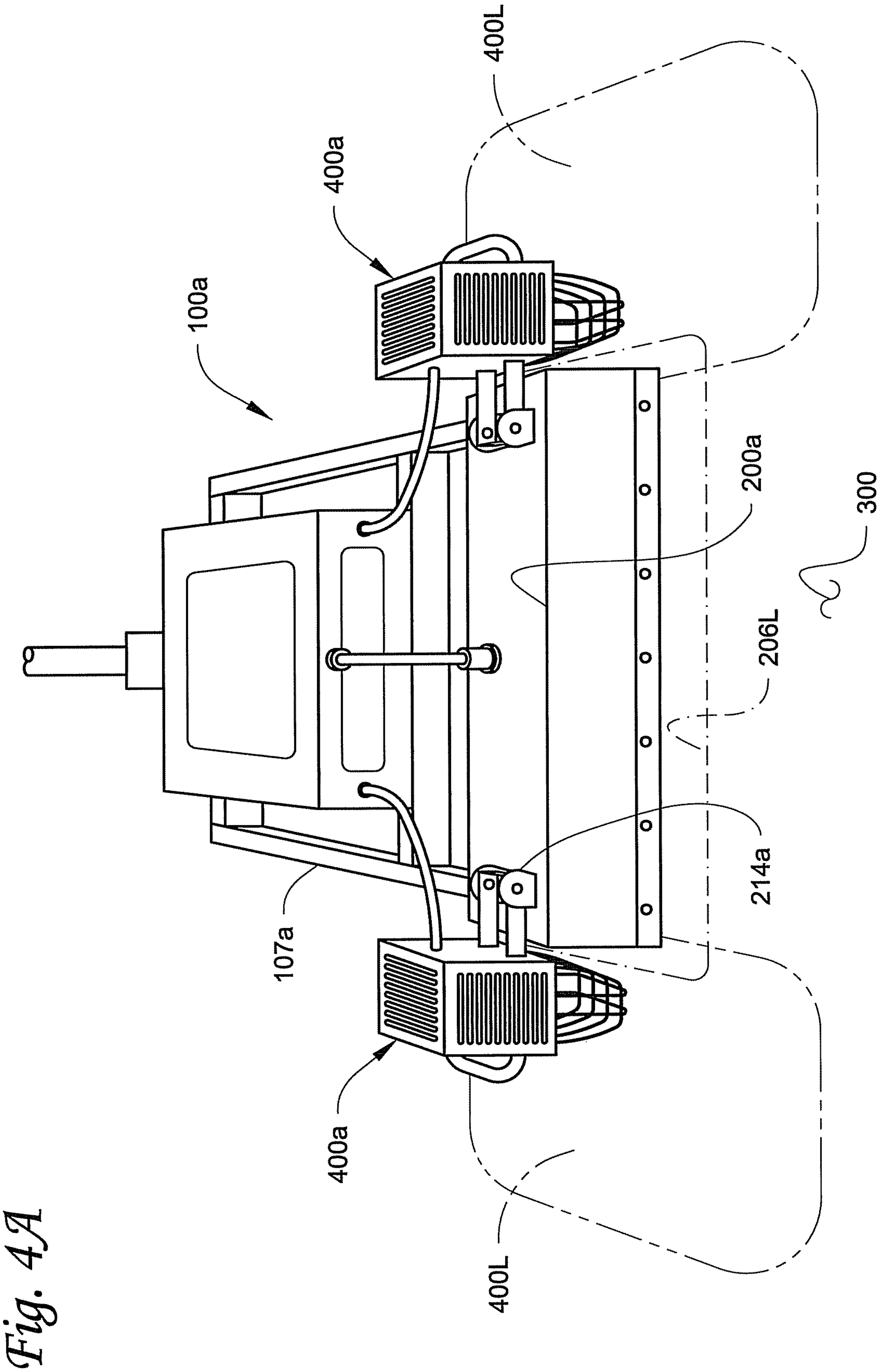
FIG. 4A is a perspective view of a UV curing apparatus in accordance with another embodiment of the invention.
Figure 4B:
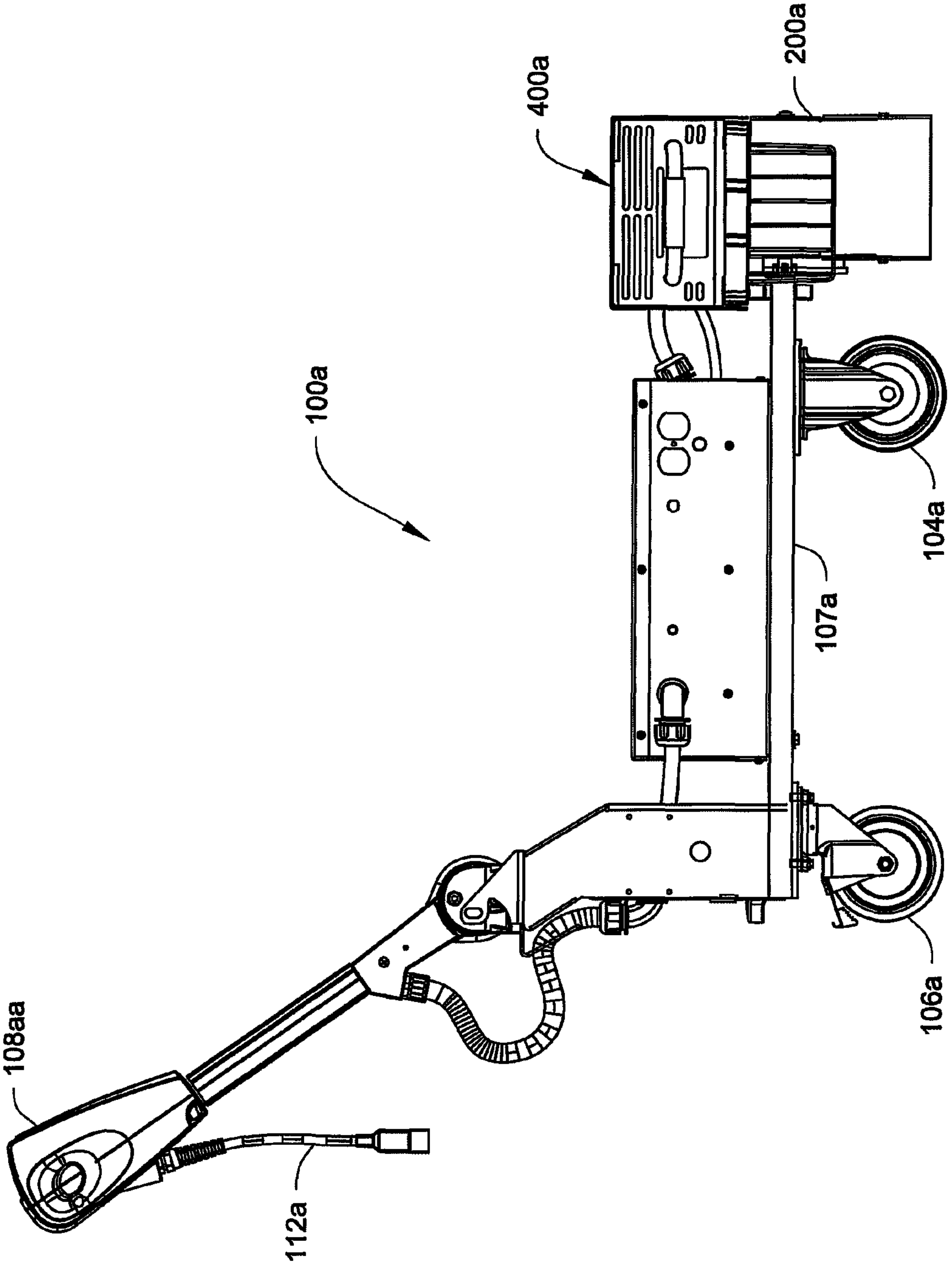
FIG. 4B is a side elevation view of the UV curing apparatus of FIG. 4A.
Figure 4D:
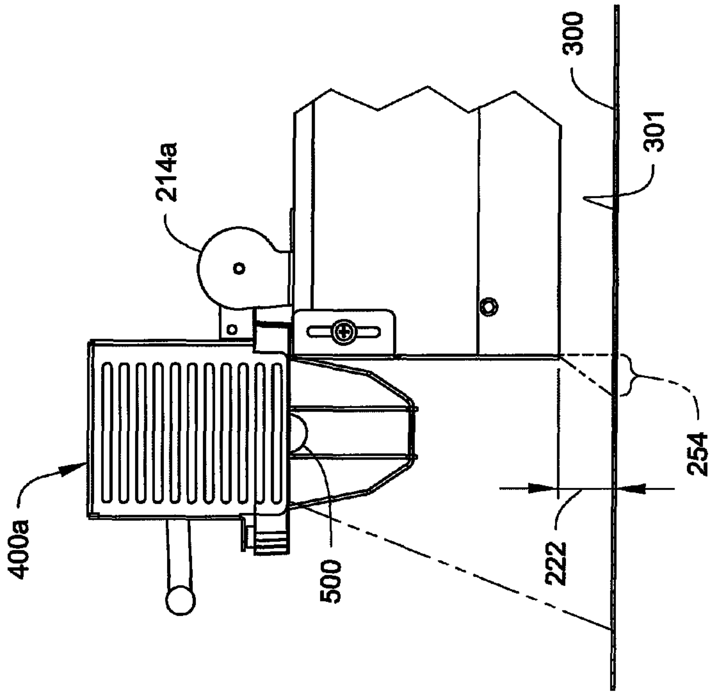
FIG. 4D is a partial side-to-side cross section of the curing head of the apparatus of FIGS. 4A-4B.

While the illustrated embodiment of FIG. 3A shows the outer shell 202 and reflective inner surface 204 as particularly contoured, most any shape, e.g., semi-cylindrical (semi-circular in cross section) or parallelepiped (rectangular in cross section), that focuses or directs the emitted UV energy from the UV radiation source through the shroud opening and to a floor coating material 301 located on the floor surface 300 is contemplated within the scope of the invention (note: the material/coating 301 is shown at an exaggerated thickness in FIGS. 2B and 4D for illustration purposes only).

FIG. 3B illustrates a cross-sectional view of another embodiment 1200 of the curing head. In this embodiment, a reflective inner surface 1204 is formed on the underside of the outer skin or shell 1202 of the shroud. The surface 1204 may be the actual underside of the outer skin 1202 or may be a foil liner attached thereto. Otherwise, the curing head 1200 is substantially identical to the curing head 200 of FIG. 3A.

The UV energy or radiation source may include one or more UV bulbs or lamps 206 attached to the shroud and located within the interior volume. For example, in one embodiment, the UV radiation source includes three separate UV-A lamps 206 transversely spaced across the width of the curing head 200 as shown in FIG. 2A. In another embodiment, five lamps 206 may be provided and spaced across the width of the curing head 200. These lamps 206 may be medium pressure mercury flood lamps having a ballast incorporated on the lamp itself (self-ballasted). Alternatively, the lamps may be externally ballast driven, e.g., having ballasts located within the optional ballast apparatus 110 of FIG. 1. Optional cooling apparatus, e.g., fans 208, may be provided to ensure sufficient cooling of the lamps 206.

FIG. 2A also illustrates brackets 215 that support each lamp 206 within the interior volume of the shroud during operation. The brackets 215 may be attached to a lamp support member 216 which is, in turn, secured to the curing head 200 by fasteners (not shown) or by other securing methods (e.g., adhesives). A reflector 218 (see FIG. 3A) may be included with each bracket 215 to better direct UV radiation towards the floor surface 300.

The curing head 200 may be secured to the frame 102 of the machine 100 at a working height such that a lowermost surface of the UV radiation source, e.g., a surface of the lamp 206 which is closest to the floor surface, is about 4 inches (about 100 mm) to about 7 inches (about 180 mm), and in one embodiment about 5.5 inches (about 140 mm), above the floor surface 300 (see FIG. 3A). However, the curing head 200 may be adjustable (relative to the frame 102) to provide a machine 100 having most any working height.

The curing head 200 may also be designed for easy removal from the frame 102. For example, each attaching bolt, as shown in FIG. 1, may include a hand knob 116 to facilitate removal and attachment of the curing head 200 without tools. The curing head 200 may additionally include handles 214 to assist in lifting the curing head 200 once it is separated from the machine 100. While a detachable curing head 200 is not required, removal of the curing head after use and careful packaging during shipping of the machine 100 may reduce the occurrence of broken UV lamps.

The electric wires that provide power to the curing head 200, e.g., to the lamps 206 and the optional fans 208, are preferably contained within one electrical cable bundle 113 (see FIG. 1) that connects to the curing head with a single quick-disconnect electrical connector 210. Thus, most, if not all, electrical connections to the curing head 200 may be readily connected/disconnected via the single connector 210 when the curing head 200 is attached/detached from the frame 102.

On the curing head 200, separate cables 212 (see FIG. 2A) may route electrical power from the electrical connector 210 to the curing head components, e.g., the lamps 206 and fans 208.

Other features of the curing head 200 may optionally be provided. For example, to verify that the lamps 206 are functional during operation, the curing head 200 may also include lamp indicators, e.g., visual lamp indicators 230. In one embodiment, the lamp indicators 230 include a filtered window or light conduit (see FIGS. 3A and 3B) associated with each lamp. When the lamps are powered, light from each lamp 206 is clearly visible through the respective window. When a lamp 206 is nonfunctional, light visible through the associated window is substantially reduced. Although shown on the front portion of the curing head 200 in FIG. 3A, the lamp indicators 230, e.g., windows, may be located at most any location, e.g., along the top or rear portion of the curing head 200 as well.

Other optional features are also within the scope of the invention. For example, tilt switches may be included to disable the machine 100, e.g., engage a wheel brake or disable power to the lamps 206, when the machine tilts beyond a predetermined angle. Level indicators may also be used to assist the operator in coupling the curing head 200 to the machine 100. Speed indicators, such as a visual indicator (e.g., a speedometer) or an audible indicator (e.g., a tone), may be provided to indicate when a predetermined travel speed of the machine is reached.

In one exemplary embodiment of the invention, the UV curing machine 100, as described herein above and generally illustrated in FIGS. 1, 2A, and 3A is fitted with UV lamps 206 each configured to simultaneously emit UV energy at wavelengths of 360 nanometers (nm) to 370 nm (e.g., 365 nm), and from 250 nm to 260 nm (e.g., 254 nm). The lamps may be self-ballasted and, as such, do not require the separate ballast apparatus 110 of FIG. 1. The lamps 206 may operate at 120 volts AC input provided by an external electrical outlet, e.g., outlet 111 (through the cord 112 of FIG. 1).

During operation, the lamps 206 are activated and warmed up. The machine 100 may then be moved, e.g., rolled, over the floor surface 300. As it passes over the floor surface 300, the shroud may direct UV energy from the lamps 206 through the opening of the shroud and towards a portion of the floor coating material 301 applied to a first area 255 (see FIG. 2B) of the floor surface 300. The first area 255 is that area aligned with the opening of the shroud or that is otherwise located beneath the shroud and between the sidewalls 220 (e.g., the portion of the floor coating material passing under the moving head). This may cause the coating material on the first area 255 to cure relatively instantly. In one embodiment, machine travel speeds of about 3 inches per second (about 75 mm per second) to about 20 inches per second (about 500 mm per second) are typical to achieve full curing.

To reduce UV illumination emanating outside of the curing head 200 (referred to herein as "stray" UV energy or light)—particularly laterally beyond the curing head, the peripheral walls, e.g., sidewalls 220, of the shroud may extend downwardly towards the floor surface 300 as generally illustrated in FIGS. 2A and 3A. The actual distance 222 (see FIG. 3A) between the lower edge of the sidewalls 220 and the floor surface 300 may be varied to, for example, reduce the amount of stray UV illumination extending beyond the curing head 200. In one embodiment, the distance 222 is about 0.2 inches (about 5 mm) to about 1.5 inches (about 40 mm), e.g., about 0.25 inches (about 6 mm). However, the distance 222 may vary from this range to, for example, ensure adequate accommodation of floor undulations while avoiding contact between the floor surface and the peripheral walls.

In some embodiments, the distance 222 (see FIG. 3A) may be adjustable. For example, in the curing head configuration illustrated in FIGS. 2A and 3A, one or more of the four peripheral walls 220 may include an adjustable skirt portion 224 which may be raised or lowered to change the distance 222. By raising the skirt portions, the area of stray UV illumination outside of the area covered by the head 200 may be increased. Raising the skirt portion 224 along one lateral side (e.g., left or right in FIG. 2A) may be beneficial when, for instance, curing of the floor coating material 301 along the edge of a wall is required.

The actual method of securing the skirt portions 224 may vary. For example, the skirt portions may magnetically attach to the head 200, e.g., to the outer shell 202. In other embodiments, the skirt portions 224 may attach to the curing head 200 with fasteners 226 as shown. To provide adjustability, the fasteners may pass through slots 228 in the skirt portions 224, permitting each skirt portion 224 to be independently raised or lowered once the associated fasteners 226 are loosened.

FIG. 2B illustrates an enlarged partial view of a portion of the curing head 200 of FIG. 2A. In this view, one of the lateral sidewalls 220 (e.g., a skirt portion 224) of the outer shell 202 is shown. As illustrated in this view, based upon the gap 222, the stray UV light (illustrated as reference numeral 250) escaping from the head 200 may diverge laterally outward from the curing head by a distance 252. Of course, the distance 252 is dependent on several factors, including, for example, the setting of the gap 222. With certain coating materials, this escaping stray UV energy may result in a narrow band of the coating material 301 (that portion of the coating material applied to a second area 254 of the floor surface 300) immediately lateral to the curing head 200 being exposed to a less than full level of UV radiation. This reduced energy level may result in partial curing (e.g., curing of the upper coating surface only) of the coating 301 within the area or band 254.

Somewhere within the area 254, partial curing may be sufficient to cause visible surface delineation (e.g., a wrinkle) in the floor coating material 301. This delineation may appear as a visible line 256 (see FIG. 1) that tracks along one or both lateral sides of the curing head 200 as it passes over the floor surface 300. This line 256 may appear up to two minutes or longer after the curing pass. When the machine 100 then passes directly over the floor section that includes the band 254 and exposes it to a direct, full level of UV light, the visible line 256 may become "locked" into the coating. Depending on the floor color and/or texture, this line may be aesthetically undesirable.

To address this issue, embodiments of the present invention may provide a supplemental energy source (in addition to the UV energy source), 400 as illustrated in FIGS. 1 and 2A. The supplemental energy source 400 may be mounted to either or both sides of the curing head 200 of the machine 100 (shown mounted to one side only for illustration purposes) outside of the interior volume of the shroud. For example, the supplemental energy source 400 may be attached to a side of the machine 100 such that it delivers energy to a portion of the UV-curable coating material 301 applied to the second area 254 of the floor surface 300 that is located laterally beyond the shroud, e.g., outside of the sidewalls, as shown in FIG. 2A. The supplemental energy source 400 may be activated during the curing process to reduce or eliminate the line 256 within the area 254. The energy source 400 may optionally be movable between a use position (illustrated in solid lines in FIG. 2A) and a storage position (illustrated in broken lines). In the illustrated embodiment, movement of the energy source 400 between the use and storage positions may be achieved through pivoting of the energy source relative to the curing head.

The supplemental energy source 400 may not, at least in the illustrated embodiment, be another UV energy source like that found in the curing head 200. Rather, in the illustrated embodiments, the supplemental energy source may be a light source selected from the group including, for example, incandescent, halogen, fluorescent, and LED sources.

During use, the UV radiation source and the supplemental light source 400 may be simultaneously activated and the machine 100 moved over the floor surface. As the machine moves, the supplemental light source 400 may simultaneously illuminate the portion of the uncured UV-curable coating material 301 that covers the second area 254 of the floor surface 300 (that area that lies beyond the lateral edge of the curing apparatus) while the UV radiation source illuminates and cures the coating material that covers the first area 255 (that area under the shroud and between the sidewalls).

It has been discovered that the use of the supplemental light source 400 in this manner may reduce a curing potential of the stray UV energy that escapes beyond the lateral edge of the curing apparatus (e.g., laterally beyond the shroud) and thus substantially reduces or eliminates lines 256 that may otherwise form as a result of the stray UV light. The elimination of this line was observed under both low and high ambient light level conditions.

Various reasons may explain the effectiveness of using the supplemental light source 400 with the UV curing machine 100. For instance, due to the direct incidence of energy from the light source 400 on the second area 254, it may effectively alter, e.g., increase, the molecular weight of the uncured coating material that is applied to the second area before the stray UV energy has an opportunity to partially cure the coating material within the second area 254. In addition or alternatively, the supplemental light source 400 may disrupt (or interfere with) the wavelength of the stray UV energy escaping laterally beyond the shroud (e.g., beyond the sidewalls 220) to reduce its effective curing power.

In the illustrated embodiment, the supplemental light source 400 may be powered from the same power source used for the UV energy source. Moreover, the source 400 may be attached to the curing head 200 in any number of ways. For instance, the source could be magnetically attached to permit quick relocation of the source from side to side. Alternatively, the source 400 may be pivotally attached to either or both sides, or to a central location permitting a single source to be quickly pivoted for use on either side. In yet other embodiments, the source 400 may be integrally formed with the shroud.

EXAMPLE

FIGS. 4A-4D illustrate a UV curing apparatus or machine 100*a* in accordance with another embodiment of the invention. The machine may have some similarities to the InstaCure+floor curing machine that forms part of the InstaCure floor coating system distributed by Tennant Company of Minneapolis, Minn., USA. The machine 100*a* may also be similar to the machine 100 described herein above (e.g., it may include a curing head 200*a*, frame 107*a*, cord 112*a*, and handles 108*aa* (see FIG. 4B) that are similar in many respects to the like components of the machine 100). It is noted, however, that the machine 100*a* incorporates two caster wheels 106*a* (only one visible in FIG. 4B) in addition to its two front wheels 104*a*.

Figure 4C:
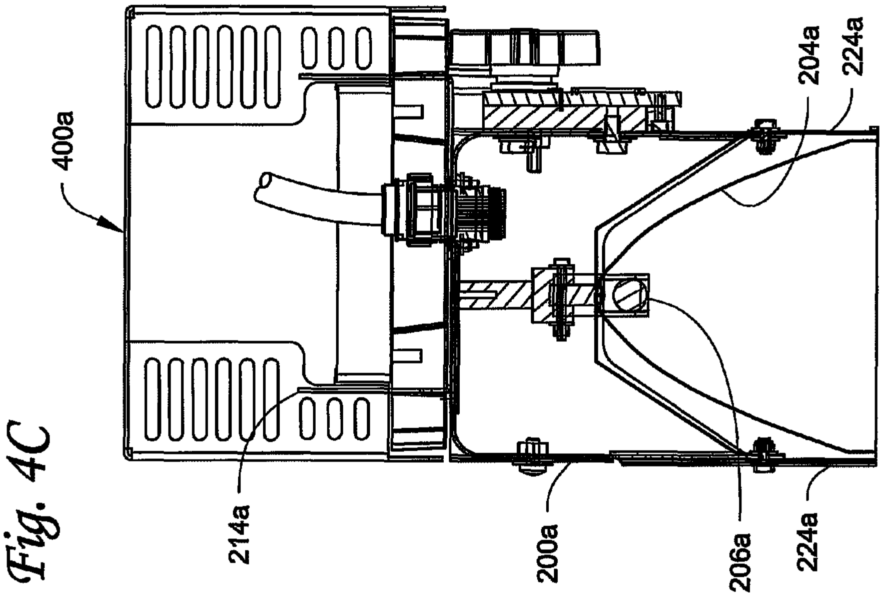
FIG. 4C is a partial front-to-back cross section of a curing head of the curing apparatus of FIGS. 4A-4B.

The curing head 200*a* of the machine 100*a* may form a shroud having a parallelepiped shape as shown in FIGS. 4A-4C rather than the contoured head shown in FIGS. 1, 2A, and 3A. However, the interior of the head 200*a* may still include a reflective liner 204*a* or similar feature (see FIG. 4C) designed to direct UV light from UV energy sources 206*a* to the horizontal floor surface 300 through an opening formed in the bottom of the head. Moreover, the machine 100*a* uses five UV-A bulbs 206*a* extending across a curing head width of about 27 inches (about 700 mm). In this example, the bulbs were model MHL-250 bulbs available from Ushio America, Inc., of Cypress, Calif., USA. The bulbs are configured to simultaneously emit UV radiation at wavelengths of 365 nanometers (nm) and 254 nanometers. The UV bulbs were each positioned about 5.5 inches (about 140 mm) from the floor surface.

The machine 100*a* was outfitted with a supplemental light source 400*a* on each side of the curing head 200*a*. In this example, the light source 400*a* was a model PQS45 manufactured by Cooper Lighting of Peachtree City, Ga., USA, having a halogen source, e.g., bulb 500, rated at 500 watts. A pivot 214*a* was included to pivotally attach the source 400*a* to the curing head 200*a*. The face of the bulb source 400*a* was located about 8.5 inches (about 220 mm) above the floor surface and was directed towards the second area 254 immediately and laterally outboard of the curing head 200*a* as shown in FIGS. 4A and 4D.

The UV curing machine 100*a* configured as described above cured a 27 inch (about 700 mm) wide strip of, in one example, Eco-UVC UV curable floor coating material manufactured by Tennant Company (applied over a concrete floor and having a coating thickness of about 0.003 inches (about 0.08 mm)) at a travel speed of about 9 inches per second (about 230 mm per second) to about 17.5 inches per second (about 450 mm per second) first with the supplemental light source 400*a* deactivated. In this embodiment, the lateral sidewalls were fixed (e.g., had no adjustable side skirts) and the front and rear sidewalls included adjustable skirts 224*a* all of which were set to provide a gap 222 (see FIG. 4D) of about 0.25 inches (about 6 mm) between the bottom of the shroud and the floor surface 300. With this configuration (e.g., light source 400*a* deactivated), the machine 100*a* sometimes left a visible wrinkle or line in the coating about 1.0-1.5 inches (about 25-40 mm) outboard of the lateral edge of the curing head (within the second area 254 shown in FIG. 4D).

The supplemental light source 400*a* was then activated and the machine 100*a* was then again passed over a section of uncured floor coating material. In this instance, no line or wrinkle was apparent. FIG. 4A shows an exemplary illumination pattern resulting from activation of both the UV source 206*a* (see area 206L) and the supplemental light source 400*a* (see area 400L).

A sensor (model no. EPP2000C-100 manufactured by StellarNet, Inc. of Tampa, Fla., USA) was then placed on the floor at a distance of about one inch (about 25 mm) from the side of the curing head 200*a* of the machine 100*a* (e.g., within the second area 254) to measure stray UV energy. A neutral density filter (model no. 47-207, UV-VIS ND filter sold by Edmund Optics of Barrington, N.J., USA) was placed over the sensor prior to testing.

Figure 5:
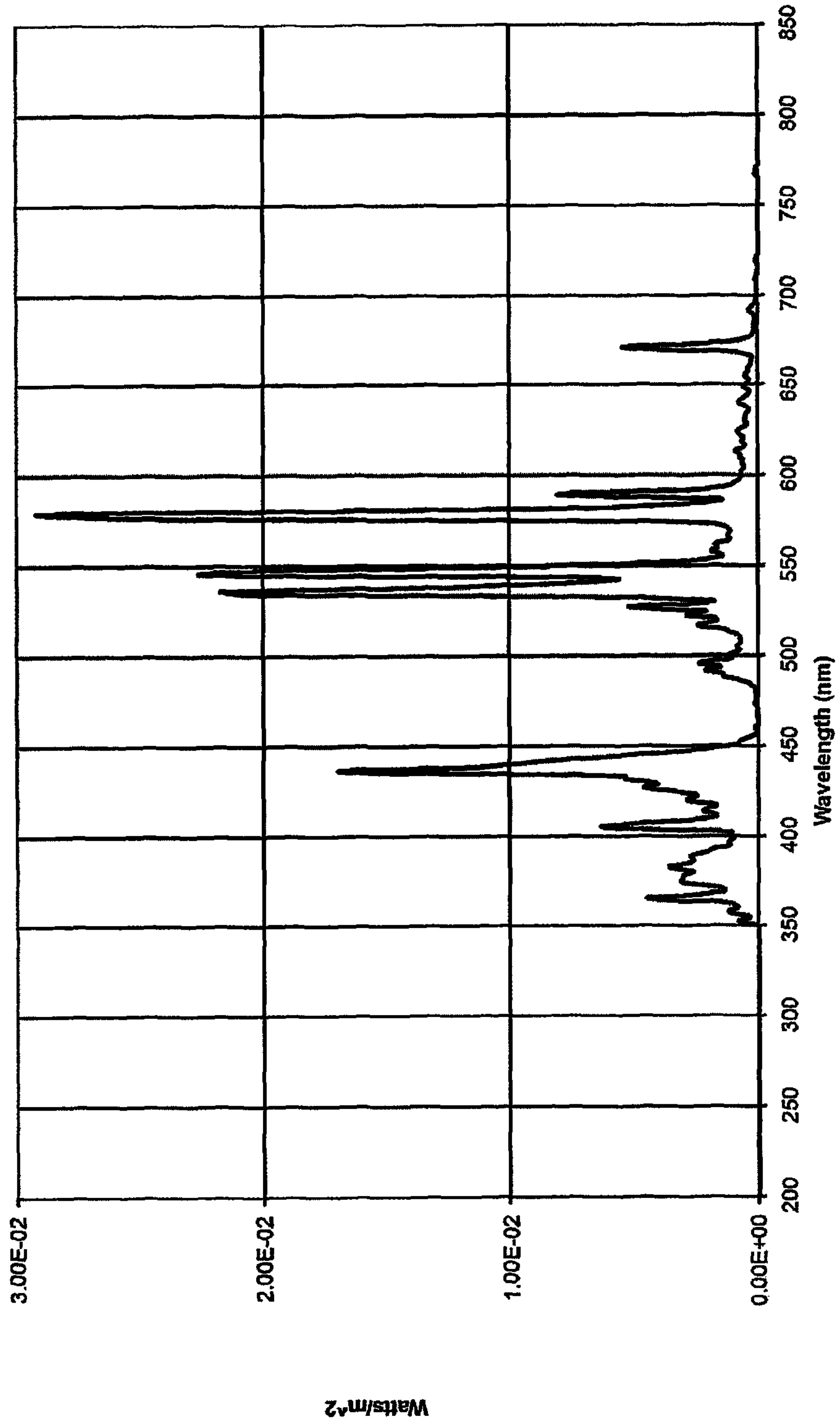
FIG. 5 is a plot illustrating intensity levels detected outside of the curing head of FIGS. 4A-4B with a supplemental energy source in accordance with one embodiment of the invention deactivated and a UV energy source activated, wherein wavelength (measured in nanometers (nm)) is shown along the x or horizontal axis, and intensity (measured in watts/square meter (watts/m^2)) is shown along the y or vertical axis.
Figure 6:
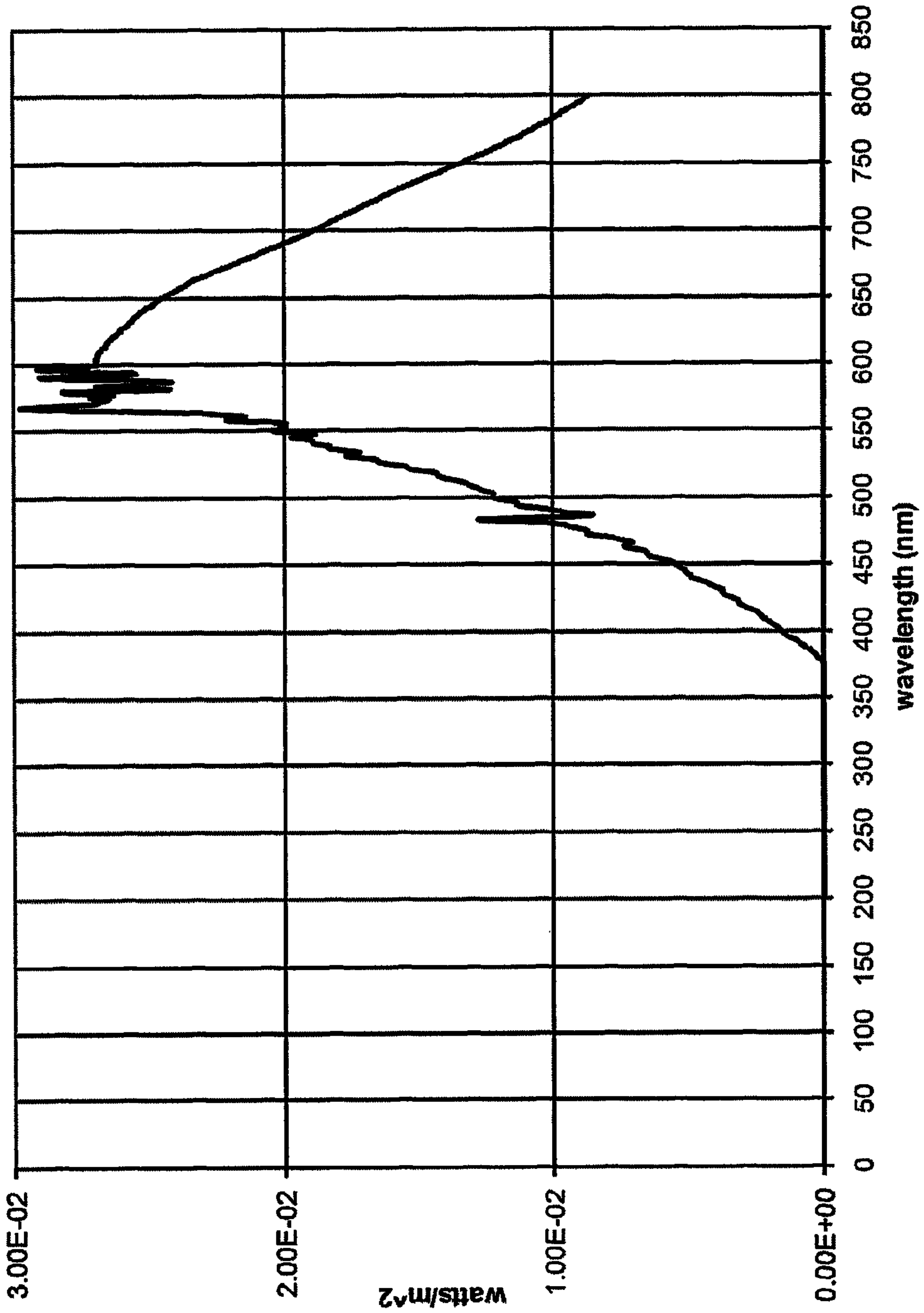
FIG. 6 is a plot illustrating intensity levels detected outside of the curing head of FIGS. 4A-4B with a supplemental energy source activated and a UV energy source deactivated, wherein wavelength (measured in nm) is shown along the x or horizontal axis, and intensity (measured in watts/m^2) is shown along the y or vertical axis.

When the UV source 206 alone of the machine 100*a* was then activated (i.e., the supplemental light source(s) 400*a* was turned off), the sensor measured power of about 16.5 watts. FIG. 5 illustrates a spectrum of stray UV energy detected with the sensor during this test. FIG. 6 illustrates a similar plot illustrating sensor readings when the UV source 206*a* was then deactivated and the supplemental light source 400*a* was activated.

Figure 7:
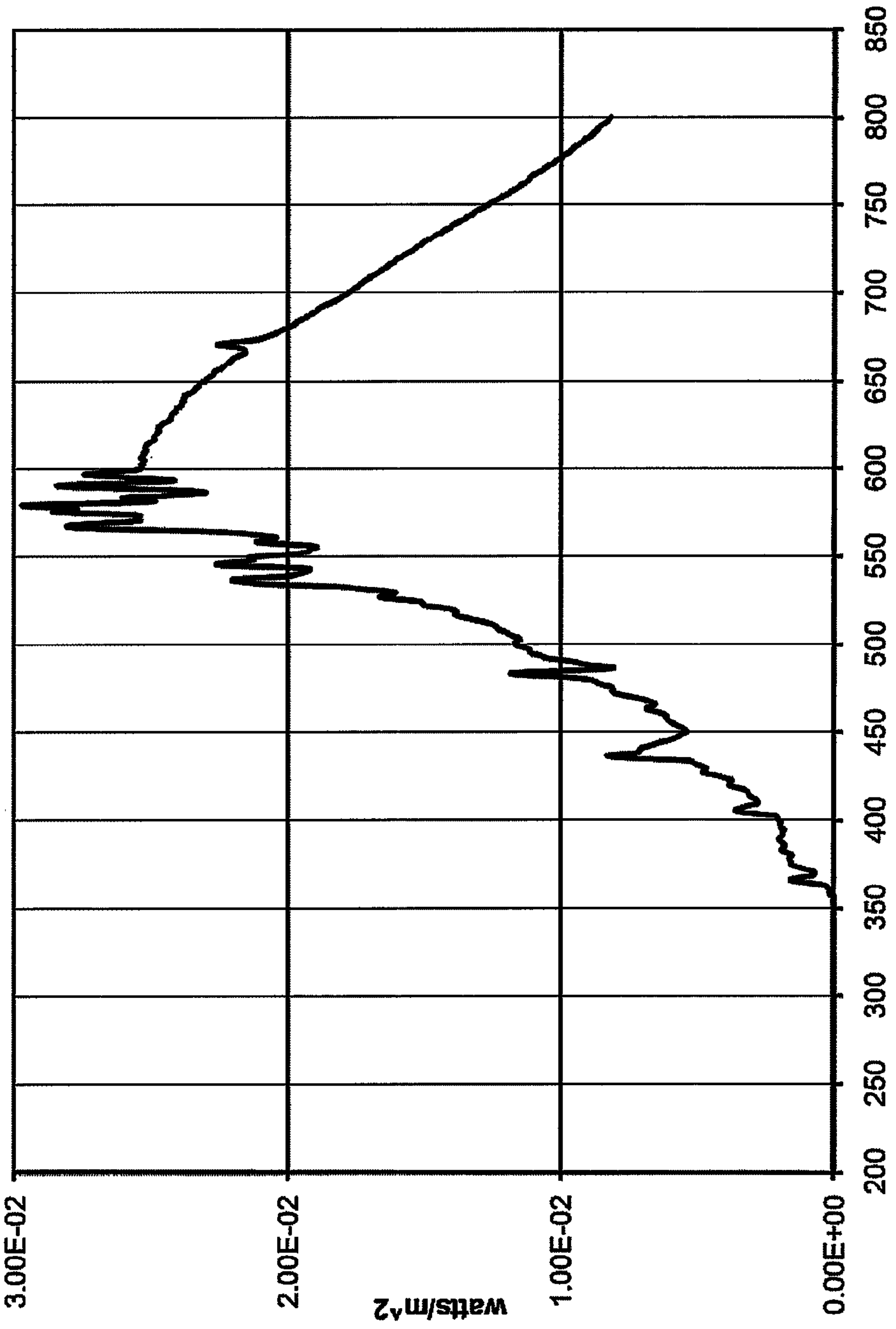
FIG. 7 is a plot illustrating intensity levels detected outside of the curing head of FIGS. 4A-4B with both a supplemental energy source and a UV energy source activated, wherein wavelength (measured in nm) is shown along the x or horizontal axis, and intensity (measured in watts/m^2) is shown along the y or vertical axis.

FIG. 7 illustrates sensor readings when both the UV source 206*a* and the supplemental light source 400*a* were simultaneously activated. In this particular instance, the sensor detected power of only about 4.3 watts at the same sensor location. FIG. 7 illustrates this spectrum cancellation effect of the supplemental light source 400*a* and the changing wavelength pattern as compared to FIG. 5.

It is apparent from this testing that the supplemental light source 400*a* does not cure the coating material. Rather, the light source 400*a* appears to interfere in some capacity with the stray UV energy, or at least interferes with the ability of the stray UV energy to effect curing of the uncured floor coating. One possibility is that the supplemental light source provides reduced activation energy and may slowly initiate a molecular weight increase of the floor coating material, thus decreasing its rate of cure when subject to the reduced energy of the stray UV energy impinging thereon. Alternatively, the supplemental energy from the source 400*a* may disrupt the UV energy wavelengths, reducing its ability to cure the coating. Regardless of the mechanism, however, the partial curing of the coating (e.g., any resulting line or wrinkle) within the area 254 was reduced to the point that it was no longer visible under various ambient lighting conditions.

The complete disclosure of the patents, patent documents, and publications cited in the Background, the Detailed Description of Exemplary Embodiments, and elsewhere herein are incorporated by reference in their entirety as if each were individually incorporated.

Illustrative embodiments of this invention are discussed and reference has been made to possible variations within the scope of this invention. These and other variations, combinations, and modifications in the invention will be apparent to those skilled in the art without departing from the scope of the invention, and it should be understood that this invention is not limited to the illustrative embodiments set forth herein. Rather, the invention is limited only by the claims provided below, and equivalents thereof.

What is claimed is:

1. An apparatus for curing an ultraviolet (UV)-curable coating material applied to a substrate surface, the apparatus comprising:

a curing head comprising:

a shroud defining an interior volume, the shroud forming an opening along one side, the opening positionable proximate the substrate surface; and a UV radiation source attached to the shroud, wherein the shroud is configured to direct UV energy from the UV radiation source through the opening of the shroud and towards a portion of the UV-curable coating material applied to a first area of the substrate surface that is aligned with the opening; and a supplemental light source attached to the curing head outside of the shroud, the supplemental light source configured to deliver light to a portion of the UV-curable coating material applied to a second area of the substrate surface that is located beyond the shroud and selected to reduce a curing potential of stray UV energy that escapes laterally beyond the shroud, wherein the supplemental light source comprises an incandescent light source, a halogen light source, a fluorescent light source, or an LED light source.

2. The apparatus of claim 1, wherein the supplemental light source is configured to disrupt a wavelength of the stray UV energy escaping laterally beyond the shroud.

3. The apparatus of claim 1, wherein the supplemental light source is configured to alter a molecular weight of the portion of the UV-curable coating material applied to the second area of the substrate surface.

4. The apparatus of claim 1, wherein the supplemental light source comprises a 500 Watt halogen light bulb.

5. The apparatus of claim 1, wherein the supplemental light source is movable between a use position and a storage position.

6. The apparatus of claim 1, wherein the supplemental light source comprises a first supplemental light source located on a first lateral side of the curing head, and a second supplemental light source located on a second lateral side of the curing head.

7. An apparatus for curing an ultraviolet (UV)-curable coating material applied to a floor surface, the apparatus comprising:

a frame supported for movement over the floor surface;

a curing head supported by the frame, the curing head comprising:

a shroud comprising sidewalls defining a partially enclosed interior volume, the shroud defining an opening along a bottom side of the shroud, the opening positionable over the floor surface; and a UV radiation source located within the interior volume of the shroud, wherein the shroud is configured to direct UV energy generated by the UV radiation source through the opening of the shroud and towards a portion of the UV-curable coating material applied to a first area of the floor surface that is located beneath the shroud and between the sidewalls; and a supplemental light source attached to the curing head outside of the shroud, the supplemental light source configured to illuminate a portion of the UV-curable coating material applied to a second area of the floor surface that is located outside of the sidewalls of the shroud and further configured to disrupt a wavelength of stray UV energy that escapes beyond the sidewalls of the shroud, wherein the supplemental light source comprises an incandescent light source, a halogen light source, a fluorescent light source, or an LED light source.

8. The apparatus of claim 7, wherein the supplemental light source comprises a 500 Watt halogen light bulb.

9. The apparatus of claim 7, wherein the frame further comprises one or more wheels configured to support the curing head in rolling engagement with the floor surface.

10. The apparatus of claim 7, wherein the supplemental light source is configured to increase a molecular weight of the UV-curable coating material applied to the second area of the floor surface.

11. The apparatus of claim 7, wherein the supplemental light source is pivotable, relative to the curing head, between a use position and a storage position.

12. The apparatus of claim 7, wherein the UV radiation source comprises one or more bulbs configured to simultaneously emit the UV energy at wavelengths of both: 360 nanometers (nm) to 370 nm; and 250 nm to 260 nm.

13. A method for curing an ultraviolet (UV)-curable coating applied to a substrate surface, the method comprising:

passing a UV curing apparatus over a first area of the substrate surface covered by a UV-curable coating material, thereby curing the coating material on the first area of the substrate surface;

illuminating a portion of the coating material covering a second area of the substrate surface that lies beyond a lateral edge of the curing apparatus with a supplemental light source comprising an incandescent light source, a halogen light source, a fluorescent light source, or an LED light source; and reducing, with the supplemental light source, a curing potential of stray UV energy that escapes beyond the lateral edge of the curing apparatus.

14. The method of claim 13, wherein reducing the curing potential of the stray UV energy comprises disrupting a wavelength of the stray UV energy.

15. The method of claim 13, wherein reducing the curing potential of the stray UV energy comprises increasing a molecular weight of uncured UV-curable coating material that lies in the second area.

16. The method of claim 13, wherein passing the UV curing apparatus over the first area and illuminating the portion of the coating material covering the second area occur simultaneously.

17. The method of claim 13, wherein passing the UV curing apparatus over the first area comprises illuminating the first area with a UV radiation source.

18. An apparatus for curing an ultraviolet (UV)-curable coating material applied to a substrate surface, the apparatus comprising:

a curing head comprising:

a shroud defining an interior volume, the shroud forming an opening along one side, the opening positionable proximate the substrate surface; and a UV radiation source attached to the shroud, wherein the shroud is configured to direct UV energy from the UV radiation source through the opening of the shroud and towards a portion of the UV-curable coating material applied to a first area of the substrate surface that is aligned with the opening; and a supplemental light source comprising a 500 W halogen light bulb, the supplemental light source attached to the curing head outside of the shroud, the supplemental light source configured to deliver light to a portion of the UV-curable coating material applied to a second area of the substrate surface that is located beyond the shroud wherein the supplemental light source is configured to disrupt a wavelength of stray UV escaping laterally beyond the shroud.

19. The apparatus of claim 18, wherein the supplemental light source is configured to alter a molecular weight of the portion of the UV-curable coating material applied to the second area of the substrate surface.

20. The apparatus of claim 18, wherein the supplemental light source is movable between a use position and a storage position.

21. The apparatus of claim 18, wherein the supplemental light source comprises a first supplemental light source located on a first lateral side of the curing head, and a second supplemental light source located on a second lateral side of the curing head.

22. An apparatus for curing an ultraviolet (UV)-curable coating material applied to a floor surface, the apparatus comprising:

a frame supported for movement over the floor surface;

a curing head supported by the frame, the curing head comprising:

a shroud comprising sidewalls defining a partially enclosed interior volume, the shroud defining an opening along a bottom side of the shroud, the opening positionable over the floor surface; and a UV radiation source located within the interior volume of the shroud, wherein the shroud is configured to direct UV energy generated by the UV radiation source through the opening of the shroud and towards a portion of the UV-curable coating material applied to a first area of the floor surface that is located beneath the shroud and between the sidewalls; and a supplemental light source comprising a 500 W halogen light bulb, the supplemental light source attached to the curing head outside of the shroud, the supplemental light source configured to illuminate a portion of the UV-curable coating material applied to a second area of the floor surface that is located outside of the sidewalls of the shroud wherein the supplemental light source is configured to disrupt a wavelength of stray UV energy that escapes beyond the sidewalls of the shroud.

23. The apparatus of claim 22, wherein the frame further comprises one or more wheels configured to support the curing head in rolling engagement with the floor surface.

24. The apparatus of claim 22, wherein the supplemental light source is configured to increase a molecular weight of the UV-curable coating material applied to the second area of the floor surface.

25. The apparatus of claim 22, wherein the supplemental light source is pivotable, relative to the curing head, between a use position and a storage position.

26. The apparatus of claim 22, wherein the UV radiation source comprises one or more bulbs configured to simultaneously emit the UV energy at wavelengths of both: 360 nanometers (nm) to 370 nm; and 250 nm to 260 nm.

* * * * *